Dec. 16, 1941.  C. P. NIELSEN  2,266,239
CARBON HOLDER FOR ELECTRIC ARC WELDING DEVICES
Filed Aug. 28, 1939  2 Sheets-Sheet 1
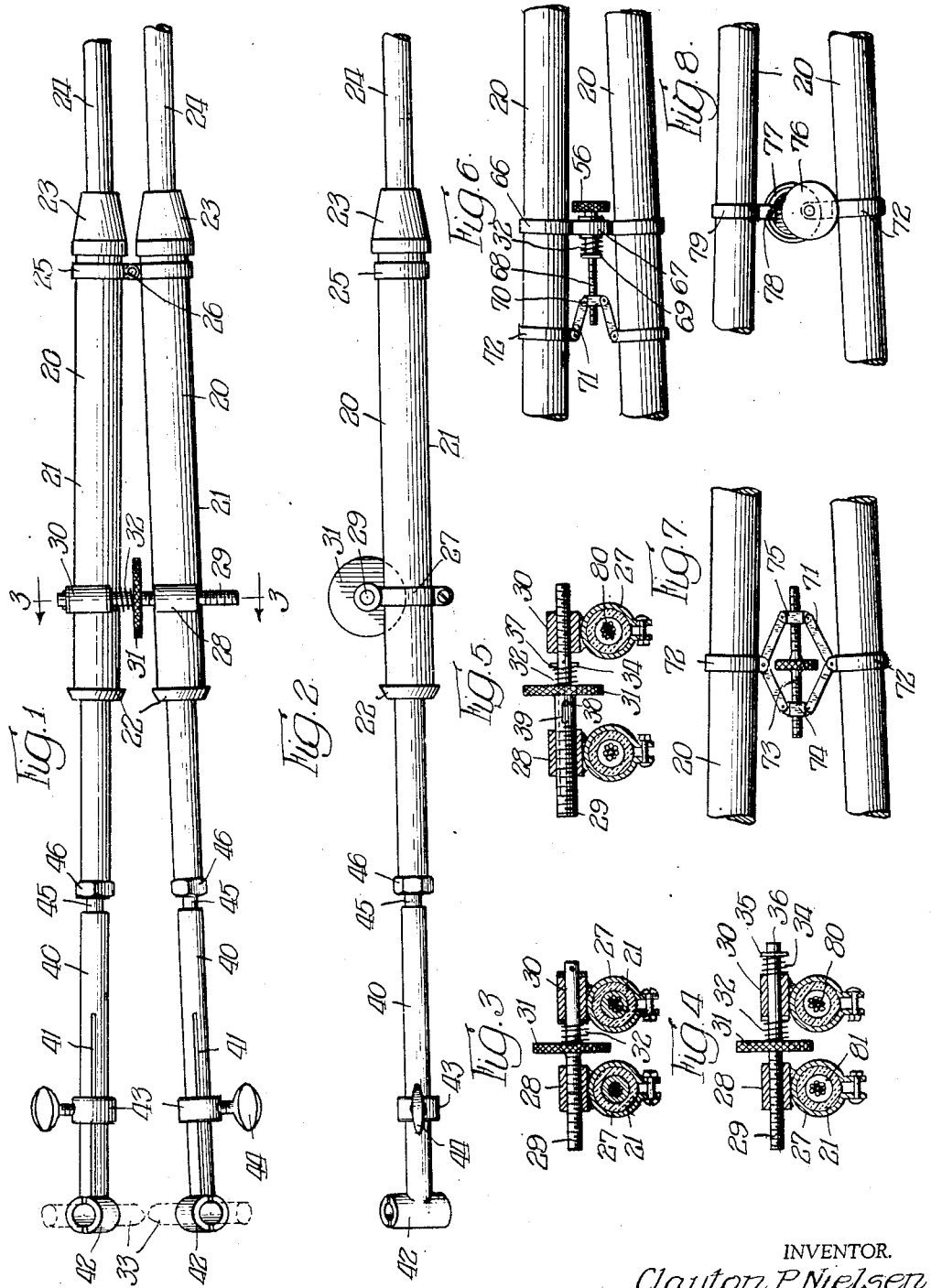
INVENTOR.
Clayton P. Nielsen
BY
ATTORNEY.

Dec. 16, 1941.  C. P. NIELSEN  2,266,239
CARBON HOLDER FOR ELECTRIC ARC WELDING DEVICES
Filed Aug. 28, 1939  2 Sheets-Sheet 2
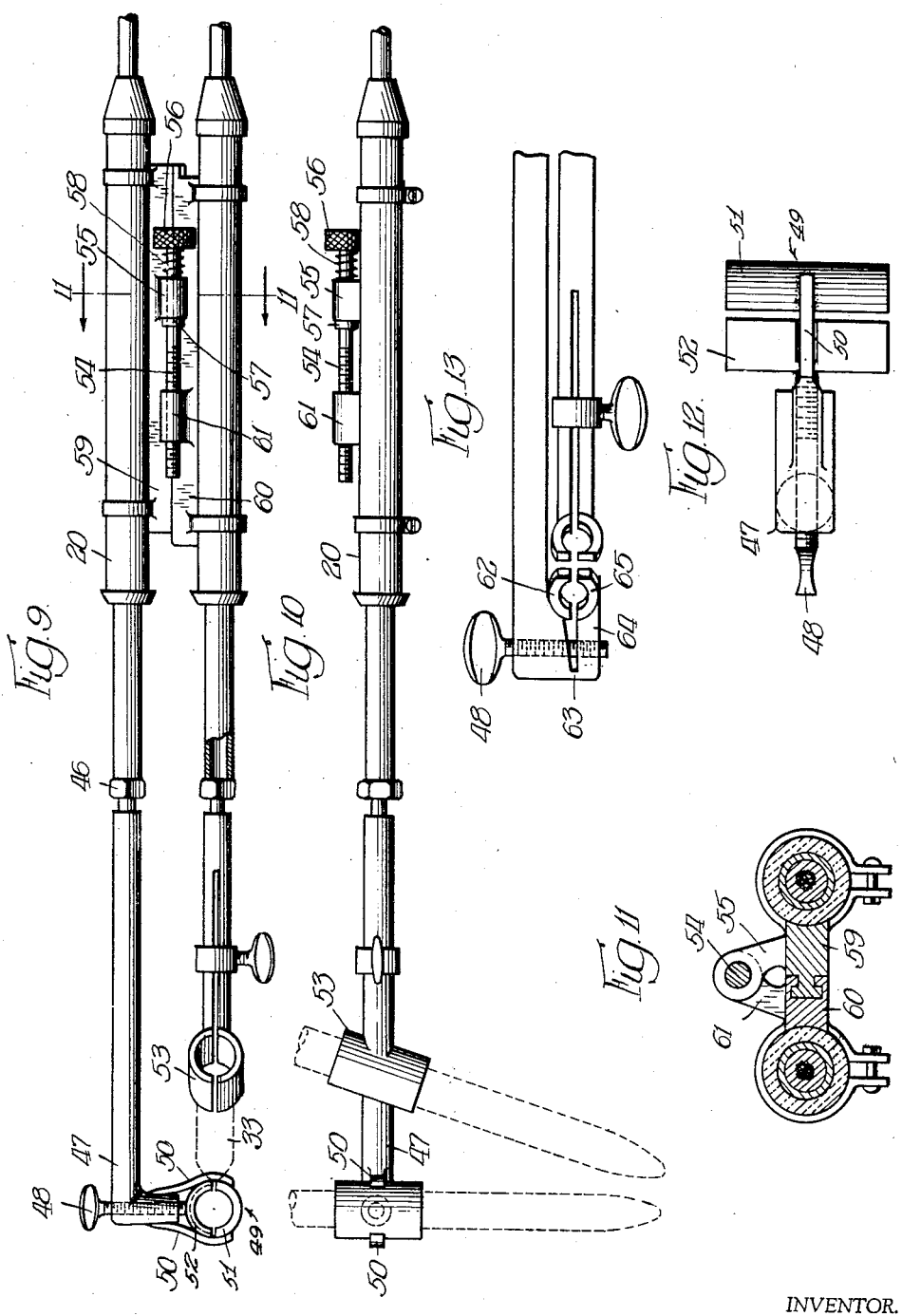
INVENTOR.
Clayton P. Nielsen,
BY
ATTORNEY.

Patented Dec. 16, 1941

2,266,239

UNITED STATES PATENT OFFICE 2,266,239

CARBON HOLDER FOR ELECTRIC ARC WELDING DEVICES

Clayton P. Nielsen, Chicago, Ill.

Application August 28, 1939, Serial No. 292,172

5 Claims. (Cl. 219—14)

This invention has to do with an arc sustaining holder of carbon or the like for an electric arc welding device. More particularly it relates to the means by which the carbon is held in position for the arc welding, and is manipulated to perform most efficiently the arc welding operation.

In the past, there have been three fairly well-known methods of performing manual welding operations. One of the primary methods has been the use of what is called a "gas torch." A second well-known method is the use of the "metallic arc." A third method is a single carbon arc in which the carbon is connected to one side of the welding circuit, and the article being welded to the other side, and the arc forms between the carbon electrode and the article being welded.

In the welding of certain substances, such as certain metals and metal alloys none of the methods mentioned above have been very satisfactory. For example, welding aluminum and aluminum alloys, copper and copper alloys and other nonferrous metals has been very difficult and in some places an impossible procedure due to inability to control the heat of a single carbon electrode, and due to the tendency of the arc of said single carbon electrode to blow or wander from the molten metal at a spot where the welding is desired, giving unstable control. It has also been difficult to weld light gauge aluminum and other nonferrous metals because of the tendency of the flame from either a gas welding device or a single carbon arc to concentrate on the metal in such a manner as to cause it to vaporize or eat out instead of fuse smoothly. With gas there is the blow caused by the pressure of the gas, and insufficient concentrated heat to cause a small molten puddle. If sufficient heat is used to cause the aluminum to be molten, a large section is likely to drop away because of the flame over a wide area.

It is an object of applicant's device to provide a carbon holder (while applicant herein refers to the holder as a carbon holder, other electrodes than carbon may be used, and it should be understood that the word carbon as applied in that sense is intended to cover other electrodes adaptable to the purpose) which can be varied at its source of current or by the distance the arc is held from the weld, or by the length of the arc, or all three, and thereby vary the heat used in the weld. It is generally hotter than the gas torch and has no blow from compressed gas. It produces welds free from porosity and blow holes in aluminum and its alloys, and copper and its alloys, as well as other nonferrous metals and alloys.

Aluminum is a rapid conductor of heat, and the use of a metallic arc wherein the metal filler forms one electrode and the article being welded forms the other electrode, results in the aluminum not reaching a molten state before the filler is deposited on it, and instead of fusing properly the filler forms a layer on the aluminum. As the material loads up with heat, if the weld fuses properly, then care must be taken that it does not "burn through."

Difficulty is experienced with gas welding of aluminum in that the weld will show up darker or streaked after the object welded has been ground or polished, and it does not show up with applicant's method.

Gas and single carbon arc welding is also objectionable in that they each tend to produce porosity and large thick sections of nonferrous metal can seldom be handled very successfully by the single carbon arc or gas method.

A further objection to the single carbon arc is the fact that it is generally necessary to use a direct current motor generator welder which is quite expensive, whereas the device shown here uses alternating current from a transformer or other alternating current supply and is generally less expensive and more economically operated.

It is a purpose of the present invention to provide a means, and to disclose a method for welding metal such as aluminum, copper and nonferrous metals, which is superior to any means yet used. It is intended that this method and means be adaptable to weld any gauge of metal.

It is a further object of this invention to provide a device whereby alternating current is readily adaptable to welding operations.

It is a further object of this invention to provide a means for overcoming all of the difficulties above mentioned, which means include the preferred embodiments of several different forms of structure.

It is an object to provide a means for holding the carbons properly adjusted, and an arrangement whereby the carbons will be properly spaced and an arc may be readily "struck." In this connection it is a further object to provide adjusting means which make it easy to adjust the relation of the carbons to each other and thereby control the heat of the arc (as the carbons burn off or the arc widens, to a certain point, the heat increases; a very short arc gives off less heat than a wide arc), and maintain the carbons in relative adjustment without trouble and while in operation. The preferred embodiments of this adjusting means will be disclosed.

It is a still further object to provide a carbon holder which is easily manipulated from the side so that when holding the device naturally the arc and the work being performed are always clearly visible to the operator.

It is an object to disclose a holder which is made out of two metals, such as brass and steel, one of the metals being nonferrous and capable of conducting electricity without heating to any appreciable degree, and the other metal being ferrous and a good conductor of electricity, but which probably will heat to a greater degree than the nonferrous conductor. The ferrous metal having a lower heat conductivity is capable of resisting heat from the arc and preventing a feed-back to the handle.

It is a purpose to disclose an improved clamping means actually holding the carbons in the holder in proper position.

It is a purpose to provide a device which is inexpensive to manufacture and easy to manipulate, and which can be handled without discomfort to the operator.

Other objects and advantages of the invention will appear as the nature of the improvements is better understood, the invention consisting substantially in the novel construction, combination and arrangement of parts hereinafter fully described, illustrated in the accompanying drawings, and finally pointed out in the appended claims.

In the drawings:

Figure 1 is a top plan view of the device forming the subject matter of this invention, the carbons being shown in the left-hand end in dotted lines, and the connections to the power source being shown in the right-hand end in fragmentary form;

Figure 2 is a side elevational view of the device of Figure 1;

Figure 3 is a cross-section taken on the line 3—3 of Figure 1, looking in the direction of the arrows;

Figure 4 is a view similar to Figure 3, but showing a modification thereof;

Figure 5 is a view similar to Figure 3, but also showing a modification thereof;

Figure 6 is a fragmentary plan view showing a modified means for adjusting and maintaining adjustment of the handles for the device forming the subject matter of this invention;

Figure 7 is a fragmentary plan view similar to Figure 6, but showing a modification;

Figure 8 is a fragmentary plan view similar to Figure 6, but showing another modification;

Figure 9 is a view similar to Figure 1, but showing another embodiment of the device of this invention, one portion being broken away to show a construction and materials used;

Figure 10 is a side elevational view of the device of Figure 9;

Figure 11 is a cross-section taken on the lines 11—11 of Figure 9, looking in the direction of the arrows;

Figure 12 is an end elevation of the longer arm of Figure 9, being an enlarged detail view of the carbon holding mechanism; and Figure 13 is a fragmentary plan view showing a modification of the carbon holding clamps, the view being of an arrangement somewhat similar to that of Figure 9.

Referring more in detail to the arrangements shown in the various figures of the drawings, the same number indicates the same device or portion of the construction wherever used in various figures.

In the figures, 20 represents the handles in their entirety, and as shown in Figures 1, 2 and 3, the handles are provided with grips 21, of rubber or other insulation. Preferably this insulation is of rubber and fiber so that it protects against both heat and electric current. This insulation is held in place by various means, but shellac may be placed between the insulation and the handle. Also the pressure of clamps mentioned shortly hereafter effectively hold the insulation. At one end of the insulation is a fiber or the like ring 22, and at the other end is an insulating cap 23 likewise constructed of fiber or the like, which cap 23 covers and insulates a threaded bolt-shaped connection screwed into the threaded hollowed-out portion in the end of each handle of the holder. It is not deemed necessary to show the details of the fastening means involved in the threaded bolt-shaped cable connections, excepting to state that they form the contacts for each of the cables 24.

These cables 24 lead to a source of current, generally alternating, which source is not shown as probably a transformer of conventional design is satisfactory.

Surrounding the handles 20 at their lower portion and near the insulating caps 23 are clamps 25 each of which has in its open side a hole for the passage of a bolt or the like. The clamp for each of the handles is fastened, as shown, by a common bolt 26, in such a way that the handles may rotate about the bolt 26 as an axis.

On the handles 20 I have provided the clamps 27 on the upper portions of at least one of which are threaded means 28 receiving the adjusting means 29. This adjusting means is threaded to correspond with the threaded clamp element. The other clamp may have a threaded element 30 (see Figure 5) thereon, in which case the threaded element will be of reverse thread to the element 28. The reason for this is that the adjusting wheel 31, preferably knurled or the like, upon being turned will turn the adjusting means 29 and thread both handles outwardly, or inwardly, as the case may be, and thus separate or bring together the handles 20. The element 30 may however have a smooth core, as shown in Figures 3 and 4, with the spring 32 maintaining the adjusting means 29 in position with respect to the element 30, by tension. With this arrangement when it is desired to bring the carbons 33 close enough together so that the operator may "strike" an arc, the operator squeezes the handles 20 together sufficiently to overcome the tension of the spring 32 and bring the carbons 33 into the position desired. As soon as the arc is struck, release of the pressure on the handles 20 causes the spring 32 to exert tension on the element 30 sufficient to move the handles apart to the desired operating distance. They will be maintained apart by the pressure of the spring 32 on the element 30. As shown in Figure 4, a second spring 34 is provided which is maintained on the adjusting means 29 by the washer 35 which in turn is held by the pin 36.

With the arrangement of Figure 4, the operator may extinguish the arc by exerting pressure on the handles 20 in a direction to move the handles apart. The carbons will be separated for a greater distance than the arc will flow and the arc will be extinguished and not ignited again until the handles are squeezed together so as to strike the arc. This enables an operator who has work necessitating the use of the device for only a few seconds at a time or for short periods to strike an arc and extinguish an arc without trouble, and save time and current in so doing.

In Figure 5, the spring 32 is journaled at one end against a washer 34 and at the other side against the adjusting wheel 31. The adjusting means 29, as shown in Figure 5, is arranged differently in that it is at least partially hollow adjacent the position of the adjusting wheel 31, on the left-hand end of the adjusting means 29 as shown in Figure 5, and a member 37 is slideably arranged to move into the hollow portion when the handles 20 are pressed together. This member 27 is retained in the hollow portion of the means 29 by a pin member 38 which works through the slot 39. When it is desired to strike an arc, pressure on the handles 20 will depress the spring 32 and allow the member 37 to move into the hollow portion of the means 29 a distance adjustable by the length of the slot 39. As soon as the arc is struck the pressure of the spring 32 moves the handles 20 back into relative operating position. This operating position may, as explained above, be varied by turning the adjusting wheel 31 to thread the members apart or together as the case may be.

The handles 20 are formed of a conducting metal, such as brass or the like, which do not offer much resistance to the passage of electricity, and therefore do not heat materially. When these handles are covered by the grips 21, it is safe for the operator to use them. The sections between 46 and 22 are also insulating material, covering the conducting metal of the handles 20. This will be explained more fully later.

On one end, these handles 20 have the tip rods 40, which preferably are formed with tip slots 41, and tips 42.

The tips 42 are generally provided with holes therethrough, and may be set at an angle as will be explained later. They generally have the extremities slotted as shown in Figures 1, 9 and 13. The construction of Figures 9 and 13 will be taken up later.

Around the tip rods 40, at a position over the tip slots 41, and somewhere near the tips 42, I have provided the clamps 43, which have means for pressing the sides of the tip slots 41, together, such means comprising a wing bolt 44. When the carbons have been inserted in the tips 42, the wing bolts 44 are threaded downwardly and press the slots together holding the carbon 33 firmly in position. The clamps 43 may be eliminated, and a wing bolt such as 44 used by drilling a hole in one side of the tip rod opposite the slot, and on the other side having a perforation with threads into which the wing bolt may be threaded. The shoulder of the wing bolt will force cooperation with the threaded portion in pulling the edges of the slot together.

The tip rods 40 are secured to the handles 20 by any desirable means but a preferable method is to have the handles 20 slightly slotted at the position of joinder (the slot not being shown hereon), and the handles 20 being slightly tapered and threaded at that point. These are also hollowed out and receive the reduced end 45 of the tip in the hollowed-out portion. The nut 46 is then threaded on to the handle 20 and presses the edges of the slot together so that the tip rod 40 is snugly held in place. By this means the rod may be turned by hand pressure to adjust the angle of the carbons 33.

The tip rods 40 are preferably made of ferrous metal such as steel which is a good conductor and highly resistant to heat. The flow of electricity through the tip rods 40 will heat them to some extent but will not bring them to the fusion point, or seriously damage them, and it will also stand the heat of the carbons 33 insofar as it is transmitted to the tip rods 40.

In the arrangement shown in Figures 9, 10 and 13, the operator has a distinct advantage in that he is able to watch the arc from the side without strain. In other words he does not have to look over the end or through the bars of the handles in order to see what he is doing. In this arrangement the holder has the L-shaped tip rod 47. On the foot or segment of that is provided a wing bolt 48, which passes through the short segment lengthwise as is clearly apparent from Figures 9 and 12. The wing bolt is threaded to screw into or out of the L-shaped tip rod 47. The tip 49 is comprised of the feet 50 which are permanently affixed to the outer tip portion 51. The inner tip portion 52 is slidably carried by the feet 50 or may be journaled directly on the end of the wing bolt 48. This inner tip portion 52 is adjustable with respect to the outer tip portion 51. A carbon placed in the tip 49 may be securely clamped therein by use of the wing bolt 48.

The other holder 20 as shown in Figure 9, may be a normal handle, but is usually provided with a slanting tip 53 so that the carbons may be brought together before the tips 53 and 49 are close enough together to short circuit.

By means of the adjusting mechanism on the handles, the tips 53 and 49 may be adjusted relative to each other, and may be movable to strike an arc. For this purpose I have provided the thumb bolt 54 which carries the lug 55 thereon. This lug 55 has a hollow hole longitudinally therethrough and is adapted to fit over the thumb bolt 54. It is retained on the thumb bolt 54 a short distance from the head 56 (which head is knurled for easy manipulation), by the segmented washer or the like 57 which is journaled on the shaft of the thumb bolt 54. This arrangement will be clear from examination of Figures 9 and 10. The lug 55 abuts against the spring 58 for the reason hereinafter explained, and is slidable on the thumb bolt 54 between the head 56 and washer 57. The lug 55 forms a portion of a tongued member 59 which is clamped around and forms a portion of the grip of the handle 20. This tongued member 59 is adapted to slidably engage a correspondingly grooved member 60 which is fastened to and forms a portion of the grip of the other handle 20. The member 60 carries a longitudinally threaded lug 61 into which the thumb bolt 54 is threaded. Manipulation of the thumb bolt 54 pulls the grooved member 60 on to the thumb bolt longitudinally or moves it toward the end thereof, depending on which way the thumb bolt is turned. So doing carries the handle to which the member 60 is attached and moves said handle longitudinally with respect to the handle carrying the tongued member 59, so that the tips 49 and 53 are moved close together or far apart as may be desired.

Holding the handle carrying the member 59 and pushing the thumb against the flat surface of the head 56 of the thumb bolt 54, will shove the handle carried by the member 60 forwardly to a position where the arc may be struck. Release of pressure on the head 56 permits the tension of the spring 58 to move the head 56 and the lug 55 apart and the handles will resume their operating position. This arrangement is particularly desirable in that it may be gripped tightly and not change the relative position of the carbons.

A modified arrangement of the device illustrated in Figures 9 and 10, but which has not been illustrated but is intended to be protected by this application, is the provision of means whereby the tips, and possibly the tiprods 53 are movable generally parallel to the handles, but the handles remain stationary. One method of accomplishing this purpose is to provide one of the handles 20 with a hollow portion into which the tiprod 53 is slidably inserted. The two handles are fastened securely together and the tongue and grooved members 59 and 60, are, as such, eliminated. The threaded lug 61 may be attached to the slidable tiprod, mentioned above, whereby threading the thumb bolt 54 through the lug 61 will move the tiprod in a direction parallel to the handles 20. A lug, such as the lug 55, will be provided on the portions of the handles which do not move, and the thumb bolt 54 will be journaled in said lug 55, as is the case in Figures 9 and 10.

This arrangement has the advantage of a small handle grip which gripping action and twisting of the hands does not cause to get out of adjustment so that the carbons or tips are not in the wrong place.

It may be well to point out that in all of the structures, the handles 20 should be insulated all of the way up to the nut 46 for greatest safety.

In Figure 11 the particular arrangement of the tongue and grooved elements 59 and 60 respectively is clearly apparent.

Figure 13, a modified arrangement corresponding to that of Figure 9 shows the wing bolt 46 threaded through the tip rod, which has its end position jutting outwardly and with a concaved portion 62 to form one side of the tip, said outwardly jutting portion also having a slight ledge 63 at the extreme end and having its portions slanting away from the lug 64 so that manipulation of the thumb screw 46 will tend to pull the lug 64 toward the tip rod, and the concaved portion 65 on the lug 64 will match the portion 62 on the tip rod and form a holder for the carbon. The corresponding tip rod on the other handle is straight, slotted at the end as originally described, and formed to hold the carbon. Each of the tips thus provided will clamp the carbon securely, but they are preferably set at an angle with respect to the tip rods so that the carbons have their bottom portion toward each other and the top portions further apart. The tips may be straight; that is, not set at an angle with respect to the tip rods, in which case the tips should be provided with insulation on the portions adjacent each other. If the tips are straight, the carbons will maintain their parallel position all the way up as they are used up and will not need so much adjustment. This is an advantage. The other construction may likewise be insulated and straight.

It need not be shown but the tips may be squared, octagonal, or other desirable shape—the figures showing them generally rounded because the carbons are more apt to be rounded.

Other arrangements for manipulating the handles are shown in Figures 6, 7 and 8. In Figure 6, the arms 20 are provided with the brackets 66, which carry a lug 67 through which passes the thumb bolt 68. This thumb bolt is slidable for a portion of its distance on the lug 67, being stopped at one end by the head 56 and having the other stop a portion of the way up on the thumb bolt 66 consisting of a washer 69. A spring 32 is provided. At the other end, the thumb bolt 68 is threaded onto a collar 70 which has the arms 71 movably fastened thereto. These arms 71 at their other extremities fasten to the clamp members 72. The arms 71 are offset slightly so that their bottom portions are further apart than their upper portions. When the thumb bolt 68 is turned it forces these arms 71 outwardly or inwardly as the case may be thus spreading or closing the handles 20.

In Figure 7 a modification is provided in that the clamps 72 are fastened to two sets of arms 71', and the thumb bolt 73 has two ends, one provided with a left-hand thread and the other a right-hand thread. The arms 71 are fastened to the collars 74 and 75 through which the thumb bolt 73 has its respective ends threaded. Turning the thumb bolt one way will move the arms 71 by pulling the collars 74 and 75 together and push the handles 20 outwardly while turning it the other way will reverse the process.

Referring to Figure 8, a clamp 72 is provided with a cam wheel 76, which is offset so that it may be rotated. A groove 77 is provided in the cam wheel, into which sets the pin 78 of the clamp 79. A rotation of the cam 76 will manipulate the handles 20. Preferably this cam arrangement is rather resistant to movement for exerting sufficient resistance to hold the cam wheel 76 without turning unless actually manipulated by the hand of the operator.

Other means for moving the handles are feasible, including a reversal of the position of the clamp 25 and the adjustment means as shown in Figures 3, 4, 5, 6, 7 and 8. It will be necessary of course to make clamp 25 differently; that is, so that in the position where the portions 23 were closest together the tips 42 would be far enough apart to please the operator. This would be a little more cumbersome than the method shown, but it would be feasible. Another very feasible type of adjustment means would be a lever arrangement in which the clamp on one of the handles 20 is connected by a movable arm to the extremity of a lever, and the clamp on the other handle is connected either directly or through a movable arm to a position up on the lever some distance from the connection of the first movable arm. Manipulation of the lever will manipulate the arms to pull them together or force them apart, as the case may be.

The handles 20 are shown, particularly in Figures 3, 4 and 5 as comprising an inner conduction cable 80, surrounded by the metal of the handle 81, that in turn being surrounded by the insulation forming the grips 21. It is about as desirable to omit the cable 80 from passing through the handle 20, merely relying on the metal 81 (which in such event would be tubular) to form the conductor. Contacts would be made at both ends of the handles, with the cables 24 on one end and the tip rod 45 on the other.

In operation, for example in the welding of aluminum, the operator places the carbons, preferably one-half (½") inch or more in diameter in the holders and attaches the holder to a source of power, generally alternating current. The carbons are brought close together, by adjusting the number 31, for example, or by squeezing the handles against the spring 32, for example, or by other means which have been described herein, so as to strike an arc. The adjustment between the handles is then regulated so that the arc flame is as quiet as possible.

If the carbons are too close together, the flame deposits an excess of carbon on the work, which is undesirable. A rasping sound may be produced by an arc where the carbons are too close together and getting too hot (which will frequently cause the core to drop out of the carbon) or due to a poor contact between the carbons and the holder. A rasping sound is naturally undesirable.

After the arc is established and operated satisfactorily, the flame is placed close to the part to be welded. When metal beneath the arc flame is apparently hot enough (and may be tested by being quickly touched with the point of a filler rod), the filler rod may be added. It is preferable to keep the filler rod away from the flame as much as possible and keep it cool except when the filler is actually being added, in which case the filler rod is jabbed into the molten metal and removed as rapidly as possible after sufficient material has been added. If the filler rod is not kept away from the flame when filler is not being added, a ball will form on the end thereof and it is difficult to secure fusion.

When flux is used with the process, better results are obtained.

The above process has been successfully used with the device of this invention many times in welding heavy and light aluminum castings. The light aluminum may be welded "cold." With the heavier sections it is usually desirable to preheat the article being welded. Samples of the articles welded as above mentioned have been ground and polished and show no porosity. With gas welding there is usually a blowing action, and as pointed out above with a single carbon arc the heat wanders and is difficult to use in handling aluminum. With the arc method of this invention the light sections may be welded more successfully than with gas due to the fact that heat is intense and concentrated in a small area without any blowing action. It is easy to weld sheets as light as twenty gauge without backing, producing a perfect weld. The process is fast, inexpensive and easy.

The control of the heat in a single carbon arc can be varied but little by the length of the arc and lengthening of the arc increases the tendency to "blow" or wander from the molten puddle. In the twin carbon method of this invention the heat of the arc may be varied by varying the distance between the carbons. It is a point that the heat may also be varied by moving the arc closer to or away from the weld, which is not possible with a single carbon method. The heat can likewise be varied by varying the amount of power from the transformer or other source of current.

In the welding of other non-ferrous metals such as bronze and copper the same method as outlined above for aluminum is successful. The method is also good for "leaded bronze" although it is generally desirable to preheat large or thick sections.

We have, all through this specification, designated the actual arcing means as stick carbon electrodes. It is probable that that will be the most feasible means used but other materials or combinations of materials may be satisfactory for the part played by the carbon electrodes. For example, the use of a bar of tungsten points which may be kept from oxidizing by playing a continuous stream of hydrogen on them while they are in operation, would be acceptable as substitute for the carbons. Where carbons are used, as pointed out above, one of the best arrangements is to have the carbon at least one-half (½") inch in diameter.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claims.

I claim:

1. In a device of the class described, a plurality of handles, insulating means on said handles, connections from each of said handles to a source of power, a tip rod on each of said handles, each rotatable with respect to its handle, said tip rods having tips and clamping means retaining electrodes in said tips, means retaining said handles in substantially relative position at one end, means operable to adjust the relative position of the tips of said handles with respect to each other, means comprising a spring on said operable means operable to bring the tips close together to strike the arc which spring means returns the tips to their normal operating position, and means operable to move the tips apart thereby breaking the arc.

2. In a device of the class described, a plurality of handles, insulating means on said handles, said insulating means comprising handle grips of rubber or the like and fiber rings and insulating caps, means at one end of each of said handles connecting to a source of current, a slotted tip rod at the other end of each of said handles, a clamp and wing bolt fitting over each of said slotted tip rods whereby the wing bolt serves to press the sides of the slot in the slotted tip rod together when tightened down, carbon holding tips on the ends of said tip rods, said tips being slotted to correspond with the tip rods whereby operation of the wing bolt above described clamps the carbons securely in place in the tip, said tip rods having connections to the handles whereby the tip rods may be rotated to adjust the angle of the carbons with respect to each other, clamps joining the handles together at the bottom portion, said joinder being by bolt means through the two clamps so that the handles are rotatable about the bolt means as an axis, and adjusting means between the handles, said adjusting means having threads engaging a threaded means on one handle, and a smooth surface slideably engaging a retaining means on the other handle and being retained in place by a pin, and a spring means on said adjusting means normally retaining the handle which the smooth portion abovementioned engages, in position against the pin at the end of the smooth portion, whereby pressure on the handle depresses the spring and brings the tips relatively close together, and release of pressure causes the handles to reassume their normal operating position, and an adjusting wheel on said adjusting means rotation of which causes the handles to be moved apart or brought together on their tip ends thus adjusting the position of the carbons with respect to each other.

3. In a device of the class described a plurality of handles, insulating means on said handles, means retaining said handles substantially aligned in parallel relation, connections to a source of power for each of said handles, tip rods on each of said handles, a tip rod on at least one of said handles being L-shaped so that the electrode on said handle is located in a position substantially on a line with an elongation of another of said handles, the electrode abovementioned being retained in place by a tip adjustable by a wing bolt to clamp the electrode in substantially vertical position, another of said handles having a tip slanted from the vertical whereby the bottom portion of the electrode in said tip is placed adjacent the electrode in said first mentioned tip while said tips are still a substantial distance apart, means operable to adjust the relative positions of the tips, and means whereby said tips may be momentarily brought close to each other and returned to their normal position, thus striking an arc.

4. In a device of the class described, a plurality of handles, connections to a source of power for each of said handles, electrode holding means on each of said handles, electrode holding tips on each of said handles, the electrode holding tip on at least one of said handles being located substantially on a line with an elongation of another of said handles, means adjusting the relative position of the electrode holding tips, and means operable to strike an arc between the tips of said electrodes.

5. An adjusting means for handles of an electric arc welding holder comprising in combination a plurality of clamp means adapted to engage said holder, a threaded lug on one of said clamp means, and a smooth lug on the other, each lug having a passage therethrough adapted to receive a bolt-shaped adjusting means, one of said lugs being threaded to correspond with threads on the bolt-shaped adjusting means, and the other of said lugs having a smooth passage therethrough receiving a smooth portion of said bolt-shaped adjusting means, means retaining said smooth portion of said bolt-shaped adjusting means within the passage of said lug, an adjusting wheel on said bolt-shaped adjusting means between the threaded portion and the smooth portion, and spring means on said smooth portion of said bolt-shaped adjusting means between the adjusting wheel and the lug portion, normally retaining said lug portion in a position away from the adjusting wheel.

CLAYTON P. NIELSEN.